2,765,347

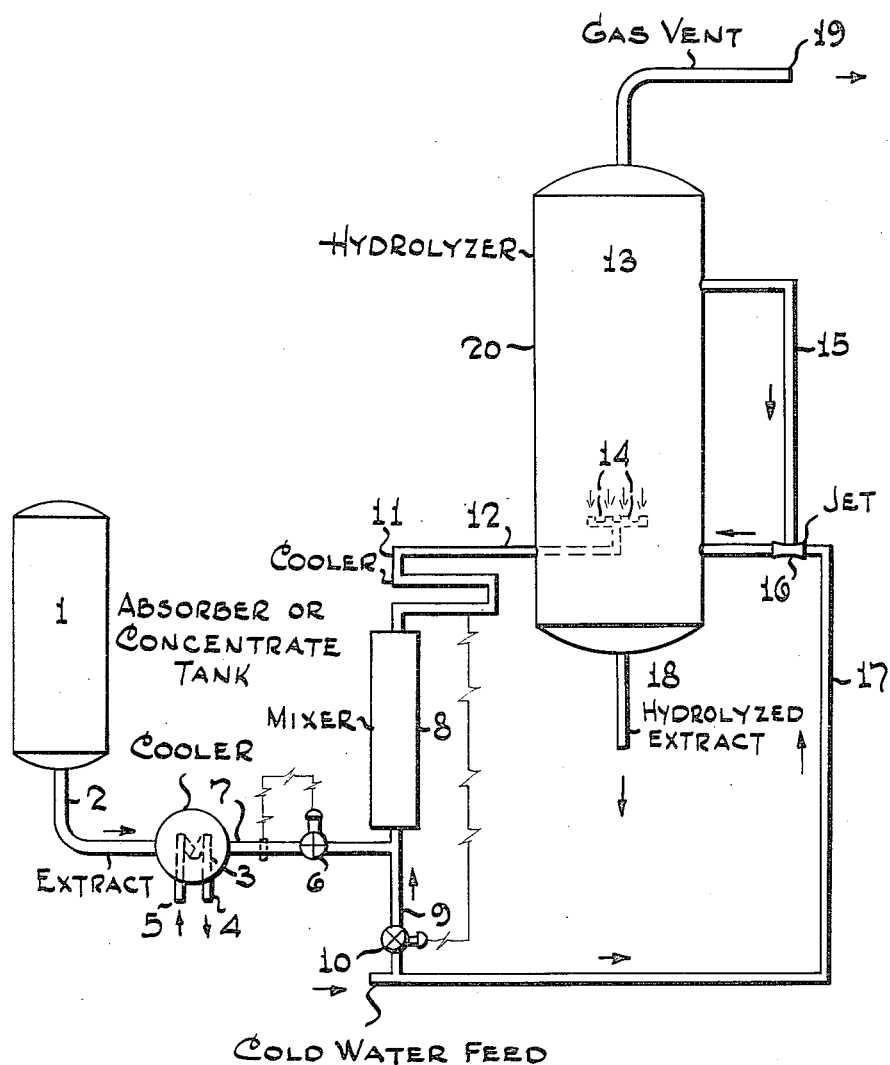

HYDROLYSIS OF ETHYL SULFATES

Brook I. Smith, Elizabeth, N. J., assignor to Esso Research and Engineering Company, a corporation of Delaware Application December 29, 1952, Serial No. 328,336

6 Claims. (Cl. 260—639)

This invention pertains to a method and means of controlling temperatures and dilution of an ethyl sulfate extract during an initial stage prior to hydrolysis of the ethyl sulfates in acid of less than 85% wt. strength $H_2SO_4$.

In synthesizing ethyl alcohol, ethylene is first absorbed in concentrated (95+ wt. percent) sulfuric acid under suitable temperatures and pressures to form the extracts containing mixtures of mono- and diethyl sulfates with some free acid. In order to convert these ethyl sulfates to ethyl alcohol, the extracts have to be diluted with water to an equivalent acid strength of 55% or lower $H_2SO_4$ (on the hydrocarbon-free basis) and maintained at this dilution for a substantial period, 10 to 20 minutes at a temperature of about 80 to 95° C. but preferably not exceeding 90° C.

Dilution of the extracts from a 95+ wt. percent $H_2SO_4$ strength to below 60 wt. percent $H_2SO_4$ strength evolves such large amounts of heat as to cause overheating even when the extract has been cooled by water prior to the dilution. Excessive high temperatures during hydrolysis cause increased formation of diethyl ether at the expense of the preferred alcohol products. Extensive cooling by refrigeration of the extracts prior to dilution is expensive.

The featured steps of the present invention for controlled cooling and dilution prior to extensive hydrolysis are:

(1) Initial mild cooling of concentrated extract to a temperature of 50° C. or lower by indirect heat exchange with water or suitable cooling fluid.

(2) Slight partial dilution of the cooled concentrated extract with water to an equivalent acid strength in the range of 85 wt. percent to 95 wt. percent $H_2SO_4$, on a hydrocarbon-free basis or until sufficient heat of dilution is evolved to raise the partially diluted extract to a temperature of about 85° C. Dilution of the extract to equivalent acid strengths much below 85% $H_2SO_4$ is to be avoided as it will result in separation of a diethyl sulfate phase from the acid solution.

(3) The partially diluted extract from step 2 is cooled to 50° C. or lower by indirect heat exchange with water or other suitable cooling fluid.

(4) The partially diluted and cooled extract from step 3 is passed to a hydrolysis zone where the remaining dilution with water to the desired final dilution of 60% at $H_2SO_4$ or lower for producing the alcohol is easily completed without danger of overheating.

The attached drawing shows a flow plan and type of means useful for applying the invention.

As shown, undiluted acid extract is withdrawn from the bottom of absorber 1 by line 2 at a controlled rate of flow to be passed through shell and tube or similar heat exchanger 3. The water or cooling medium passes into and out of the exchanger 3 by lines 4 and 5.

The acid extract of 95+% $H_2SO_4$ strength is cooled from a temperature of about 80° C. or higher to a temperature of 50° C. or lower on being passed through heat exchanger 3. Flow of the acid extract from exchanger 3 through a pressure reducing valve 6 in line 7 adjusts the pressure of the extract for the following partial diluting step, while the rate of flow is controlled.

The cooled high-acid strength extract is passed in a stream by line 7 to a mixer 8 where a stream of cooled (35° C. or lower) water is admixed from line 9. The water is preferably clean, i. e., fresh or distilled.

Mixer 8 may be simply a lead lined pipe packed with rings made of acid resistant material, e. g. ceramic or carbon. It may be constructed in any equivalent manner for rapid mixing of the extract stream and the water. A valve 10 in the water line 9 may be controlled by temperatures of the outlet of mixer 8, e. g., to increase the flow of water when the temperature becomes lower than about 80° C. or to decrease the flow of water when the temperature at the mixer outlet exceeds about 90° C.

The partly diluted extract of 85 to 95% $H_2SO_4$ strength can be further cooled efficiently by being passed as a stream through a heat exchanger 11 for indirect heat exchange with water or other cooling fluid. This second cooling can lower the partly diluted extract temperature again to below 50° C. or to between 50° and 30° C. The partly diluted and cooled extract is passed by line 12 into a hydrolysis zone 13 where adequate cold clean water is admixed to lower the acid strength from between the 85–95% range down to the range of 60–45% wt. $H_2SO_4$.

One or more hydrolysis stages may be used, but in any event rapid and thorough mixing of the added water with the partially diluted extract is desirable to prevent phase separation. Rapid mixing is aided by injecting the partly diluted extract divided as a plurality of streams from jets 14, and by recycling part of the mixture in line 15 into a mixing nozzle 16, where the cold water from line 17 for hydrolysis is injected. The hydrolyzed extract is removed from the hydrolysis vessel by line 18 and is finally subjected to stripping or distillation to remove the generated alcohol and byproduct ether from the spent aqueous acid solution. Some disengaged gaseous product, e. g., unreacted olefin is withdrawn through line 19 from the hydrolysis vessel 20.

The formation of the ethyl sulfate extracts in strong acid with a subsequent hydrolysis is not new; but the effective method of cooling and partly diluting the extract prior to hydrolysis is regarded as novel and useful.

The invention is particularly useful when applied to extracts prepared by the absorption of ethylene in 95+ wt. percent $H_2SO_4$.

The improved process allows the extract temperature during hydrolysis to be maintained at a level which avoids excessive degradation of ethyl alcohol to ether. It accomplishes this without the use of expensive equipment, such as alloy pumps, heat exchangers, refrigeration machinery, etc., which is required by the usual means of controlling hydrolysis temperatures.

Plant tests in the production of alcohol have shown that temperatures during the hydrolysis can be maintained more uniformly at the preferred temperature of about 85° C. if the described partial cooling and dilution steps are used. By doing this the ether formation has been brought down substantially below 15%. Laboratory experiments on hydrolysis of ethyl extracts show the following effect of temperature on conversion of ethylene to ether.

| Temp., °C.: | Mol. percent $C_2H_4$ as ether |
|---|---|
| 60 | 4.6 |
| 90 | 8.5 |
| 100 | 18.0 |

The invention claimed is:

1. In a process of extracting ethylene by 95+ wt. percent sulfuric acid and hydrolyzing ethyl sulfate in the acid extract, the improvement of controlling the temperature of hydrolysis within a range of 80°–90° C. by first cooling the strong acid extract to a temperature in the range of 30° to 50° C., then partially diluting the thus cooled extract to an acid strength of 85 to 95% wt. $H_2SO_4$, and again cooling it to 30° to 50° C. before hydrolyzing the ethyl sulfate by diluting with water to an equivalent acid strength below 60% wt. $H_2SO_4$.

2. In a process of extracting ethylene by 95+ wt. percent sulfuric acid and hydrolyzing ethyl sulfate in the acid extract, the improvement of maintaining the temperature of the extract between 80° C. and 90° C. as it is subjected to hydrolysis by first cooling to the extract to below 50° C., adding water to the cooled extract to give the extract and acid strength of 85 to 95 wt. percent $H_2SO_4$ while bringing the temperature of the extract up to 80° C., thereafter again cooling the extract, and adding cold water until the extract acid strength is below 60 wt. percent.

3. In the process of extracting ethylene by 95+ wt. percent sulfuric acid and hydrolyzing ethyl sulfate in the resulting acid extract, the improvement of controlling the temperature of hydrolysis by first cooling the acid extract by indirect heat exchange, then reducing pressure of the cooled extract and flowing the cooled extract at a controlled rate into a mixing zone, adding sufficient cold water to said cooled extract in said mixing zone to partially dilute the cooled extract to an acid strength of 85 to 95 wt. percent $H_2SO_4$, passing the partially dilute cooled extract through another cooling zone into a hydrolyzing zone, and adding sufficient cold water to the partially dilute extract until the extract acid strength is below 60 wt. percent $H_2SO_4$ in said hydrolyzing zone.

4. In the process defined by claim 3 in which the extract is maintained at a temperature below 95° C. while it is being diluted and subjected to hydrolysis.

5. An apparatus combination for treating a strong acid extract of ethyl sulfates, which comprises a heat exchange means for cooling the extract, a mixing means connected by a conduit to the heat exchange means for intermixing a restricted amount of cold water with a stream of the cooled extract from the heat exchange means, a conduit for leading the cooled and water-diluted extract from the mixing means to a second heat exchange means for again cooling the extract, means for passing the extract diluted with said cold water into a hydrolysis vessel, means for circulating the extract as it is being hydrolyzed in said vessel, and means for injecting water into the extract being circulated in the hydrolysis vessel.

6. A process of hydrolyzing ethyl sulfate in an acid extract which comprises first cooling hot ethyl sulfate extract, obtained by absorbing ethylene in 95+ wt. percent sulfuric acid, by indirect heat exchange to below about 50° C., reducing the pressure of the cooled extract, passing said cooled extract to a mixing zone, adding cold water to said cooled extract in said mixing zone in amounts sufficient to partially dilute the cooled extract to an acid strength of 85 to 95 wt. percent $H_2SO_4$ but insufficient to extensively hydrolyze the ethyl sulfate, maintaining a temperature within said mixing zone between about 80° and 90° C., passing the partially diluted extract to a second cooling zone, cooling said partially diluted extract below about 50° C., passing said cooled partially diluted extract from said second cooling zone to a hydrolysis zone, adding sufficient cold water to the hydrolysis zone until the extract acid strength therein is below 60 wt. percent $H_2SO_4$, maintaining the temperature in said hydrolysis zone below 95° C. and hydrolyzing the ethyl sulfate.

References Cited in the file of this patent

UNITED STATES PATENTS

| | | |
|---|---|---|
| 1,790,518 | Davis | Jan. 27, 1931 |
| 1,809,788 | Merley | June 9, 1931 |
| 2,004,084 | Scott et al. | June 4, 1935 |
| 2,014,078 | Archibald et al. | Sept. 10, 1935 |
| 2,473,224 | Schneider et al. | June 14, 1949 |
| 2,474,568 | Bannon et al. | June 28, 1949 |
| 2,529,563 | Hunter | Nov. 14, 1950 |